March 29, 1960

A. L. HERRMANN 2,930,230

CRANK ACCELERATOR

Filed Dec. 10, 1958

ADOLF L. HERRMANN,
INVENTOR.

BY S. J. Rotondi,
A. T. Dupont,
V. L. Billings and
Alvin E. Moore,
ATTORNEYS.

March 29, 1960

A. L. HERRMANN 2,930,230

CRANK ACCELERATOR

Filed Dec. 10, 1958

ADOLF L. HERRMANN,
INVENTOR.

BY S. J. Rotondi,
A. T. Dupont,
V. L. Billings and
Alvin E. Moore,
ATTORNEYS.

March 29, 1960     A. L. HERRMANN     2,930,230
CRANK ACCELERATOR
Filed Dec. 10, 1958     5 Sheets-Sheet 3
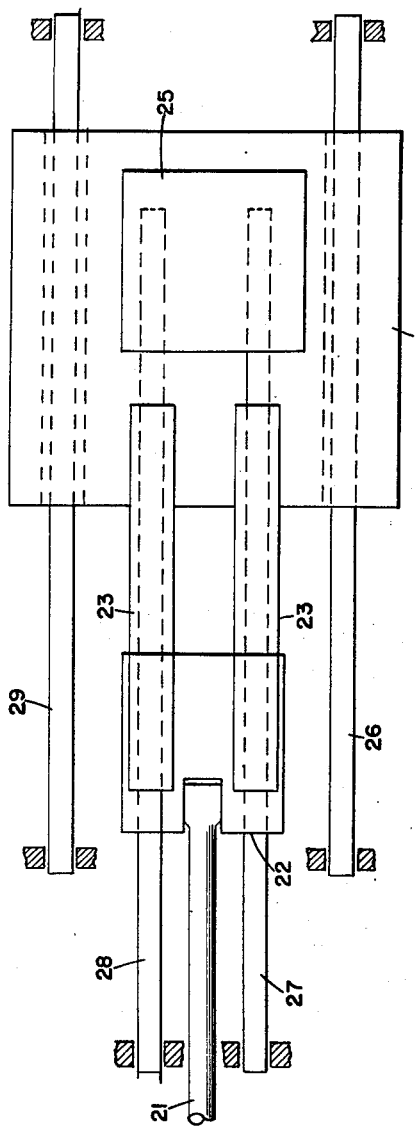
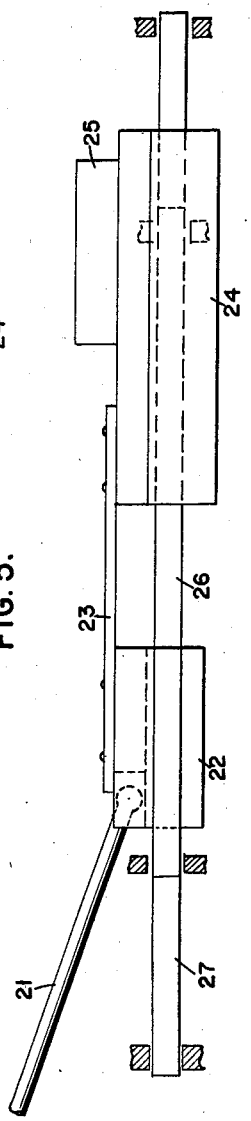
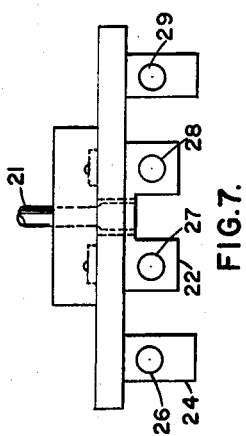
ADOLF L. HERRMANN,
INVENTOR.
BY S. J. Rotondi,
A. T. Dupont,
V. L. Billings and
Alvin E. Moore,
ATTORNEYS.

March 29, 1960

A. L. HERRMANN 2,930,230

CRANK ACCELERATOR

Filed Dec. 10, 1958

ADOLF L. HERRMANN,
INVENTOR.

BY S. J. Rotondi,
A. T. Dupont,
V. L. Billings and
Alvin E. Moore,
ATTORNEYS.

ADOLF L. HERRMANN,
INVENTOR.

BY S. J. Rotondi,
A. T. Dupont,
V. L. Billings and
Alvin E. Moore,
ATTORNEYS.

United States Patent Office 2,930,230
Patented Mar. 29, 1960

2,930,230

CRANK ACCELERATOR

Adolf L. Herrmann, Huntsville, Ala., assignor to the United States of America as represented by the Secretary of the Army Application December 10, 1958, Serial No. 779,505

13 Claims. (Cl. 73—167)

(Granted under Title 35, U.S. Code (1952), sec. 266)

The invention described herein may be manufactured and used by or for the Government for governmental purposes without the payment of any royalty thereon.

This invention relates to a crank type accelerator. Such an accelerator provides means for subjecting components to acceleration loadings in the laboratory.

When such an accelerator is used to test missile, aircraft or similar components, there is a need for simulating all of the acceleration conditions actually encountered in flight. Also there is need for a linear accelerator in which the ratio between the acceleration produced at one end of the stroke and the acceleration produced at the other end may be varied. There are further needs for an accelerator in which the magnitude of the accelerations may be varied, and an accelerator that will operate at relatively low frequencies.

In view of these facts, an object of this invention is to provide a crank accelerator which will simulate the acceleration conditions encountered by a component in actual flight.

Another object of this invention is to provide a linear accelerator which has high acceleration at one end of the stroke and low acceleration at the other end of the stroke, with a means for varying the ratio between the accelerations produced at the opposite ends.

Another object of this invention is to provide a linear accelerator which will operate at relatively low frequencies.

The foregoing and other objects of this invention will become more fully apparent from the following detailed description and from the accompanying drawings, in which:

Figure 5 is a plan view of a preferred table and crosshead, which may be connected to the connecting rod.

Figure 6 is a side view of Figure 5.

Figure 7 is an end view of Figure 6.

Figures 11 thru 14 are diagrams illustrating variations in acceleration ratios obtainable with the invention.

Figure 1:
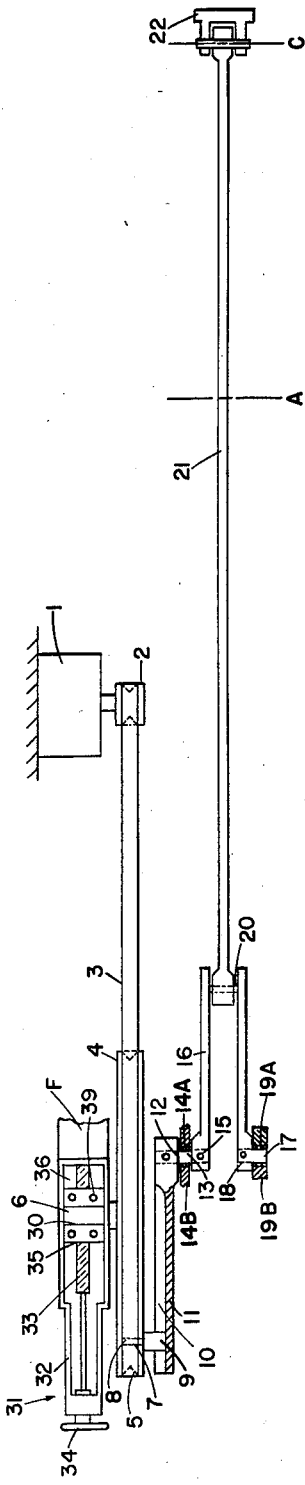
Figure 1 is a plan view, partially in section, of the crank accelerator.
Figure 2:
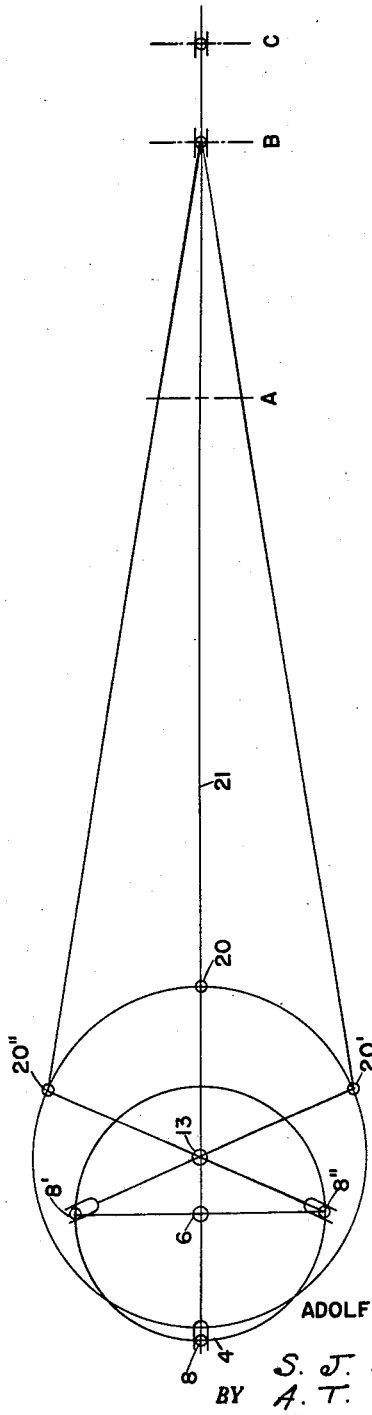
Figure 2 is a side view of Figure 1, showing the two strokes obtained from the accelerator, when the flywheel is turned thru one complete revolution, the length of one stroke, and the paths of travel of different elements of the flywheel assembly and of the crosshead.

In the drawings, wherein for the purpose of illustration there are shown different embodiments of the invention and particularly in Figures 1 and 2 the numeral 1 designates a variable speed motor having a pulley 2 mounted on the motor shaft and a belt 3 passing around the pulley 2 and flywheel 4.

Flywheel 4 comprises a V-shaped groove 5, around its circumference, for receiving belt 3, a shaft 6, fixed to and projecting from the flywheel center and an opening 7, whose axis is parallel to the axis of shaft 6, in which pin 8 is fixed at one of its ends.

The other end of pin 8 is connected to bearing 9, which is slidably secured in a longitudinal recess 10, in one end of crank 11.

The other end of crank 11 contains an opening 12 adapted to receive one end of a shaft 13, which is secured in the opening 12 by a pin, or other suitable means.

The other end of shaft 13 extends thru a stationary bearing sleeve 14A (which is in bearing support 14B) and is secured in opening 15 of one arm of the double-arm crank 16.

The other arm of crank 16 has another shaft 17, secured in opening 18 by a pin or other suitable means. This shaft is fitted into bearing sleeve 19A (which is in support 19B). The shafts 13 and 17 also could be formed as part of crank 16, instead of being connected to crank 16 by pins, or some other device.

The center pin 20 of crank 16 has a bearing in one end of connecting rod 21. This rod transmits accelerating motion to a crosshead 22, thru resilient means, for example, leaf springs 23 (Figure 5) to a test table 24 containing the component 25 to be tested, crosshead 22 is slidably supported on fixed bars 27 and 28.

The table 24 is supported by and slides relative to bars 26 and 29.

Shaft 6, referred to above, is shown as welded to the flywheel and as adapted to fit into and be journaled in bearing surface 30, located in a screw type adjusting assembly 31.

Adjusting assembly 31 comprises a housing 32, fastened to frame F. The housing supports one end of an adjusting screw 33. A knob 34, rotates screw 33, thus reciprocating slide 35 in channel 36, by means of the screw threaded engagement 37 between screw 33 and lug 38, which may be integral with slide 35 as shown, or otherwise fastened to the slide.

After the slide is adjusted to its desired position, locking nuts 39 are screwed down on the bolts 40, thus drawing up the bolt heads 41 into clamping engagement with the upper surface of grooves 42 in the sidewalls of the channel 36. In this way bearing 30 is locked in its adjusted position.

The operation of the crank accelerator shown in Figures 1 and 2 is as follows:

The knob 34 is turned thus adjusting slide 35 and obtaining the desired offset between shaft 6 and the common axis of shafts 13 and 17. The shaft 6 is then locked in place by the locking means 39 thru 41. This adjustment is made in order to obtain the desired ratio between the acceleration peaks.

Then the component to be tested is placed on the table 24, the variable speed motor 1 is turned on and power is transmitted thru pulley 2 and belt 3 to flywheel 4, causing flywheel 4 to rotate with shaft 6, about their common axis.

Crank 11 also will rotate about the axis of shaft 13 and bearing support 14B. This rotation of the crank 11 is possible due to the fact that said crank is coupled to the flywheel by sliding bearing 9.

As pointed out in the specification, crank 11 is coupled to the double-arm crank 16 by shaft 13; therefore crank 16 also will rotate about the axis of shaft 13 and bearing supports 14B and 19B.

When crank 16 thus rotates, connecting rod 21, which is connected to crank 16, transmits the motion to the crosshead 22, which is connected to the table 24 that supports the component to be tested, by resilient means 23. By this arrangement the acceleration conditions that the component will encounter in actual flight are produced.

In Figure 2, the paths followed by the different parts during each revolution of flywheel 4 are plotted to show the effect of the adjustment of shaft 6 in relation to shafts 13 and 17.

Starting with flywheel 4 in the position shown in Figure 1, the crosshead 22 will be located at the end of the maximum stroke or position C. As flywheel 4 rotates in a clockwise direction, so that pin 8 arrives at position 8' the center portion 20 of crank 16 rotates to position 20', causing crosshead 22 to travel to position B. When pin 8 arrives at position 8'' the center portion 20 of crank 16 has rotated to position 20'', causing crosshead 22 to travel from position B to position A and back to position B. Continued rotation of pin 8 back to the starting point will place crosshead 22 back in position C. In order for flywheel 4 to rotate thru a complete revolution bearing 9 must slide back and forth in recess 10. This motion has the same effect as changing the length of crank 11, to allow for the offset between shaft 6 and shafts 13 and 17, and causes the bearing 9 to travel in an eccentric path.

It is clear from the description of Figure 2 that changing the adjustment of shaft 6 relative to shafts 13 and 17 will change the ratio between the acceleration produced at one end of the stroke and the acceleration produced at the other end of the stroke, since it will change the path followed by bearing 9.

Figure 3:
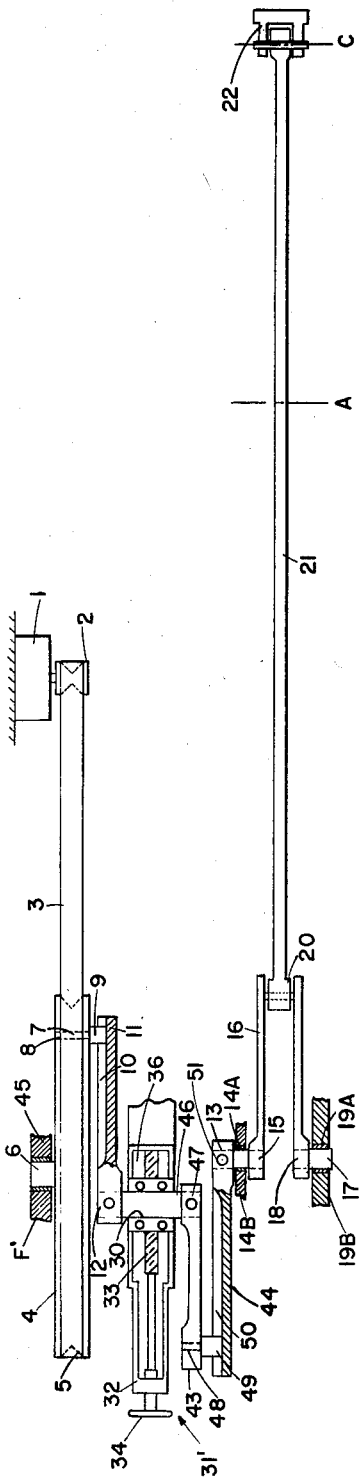
Figure 3 is a plan view, partially in section, of another embodiment of the invention.
Figure 4:
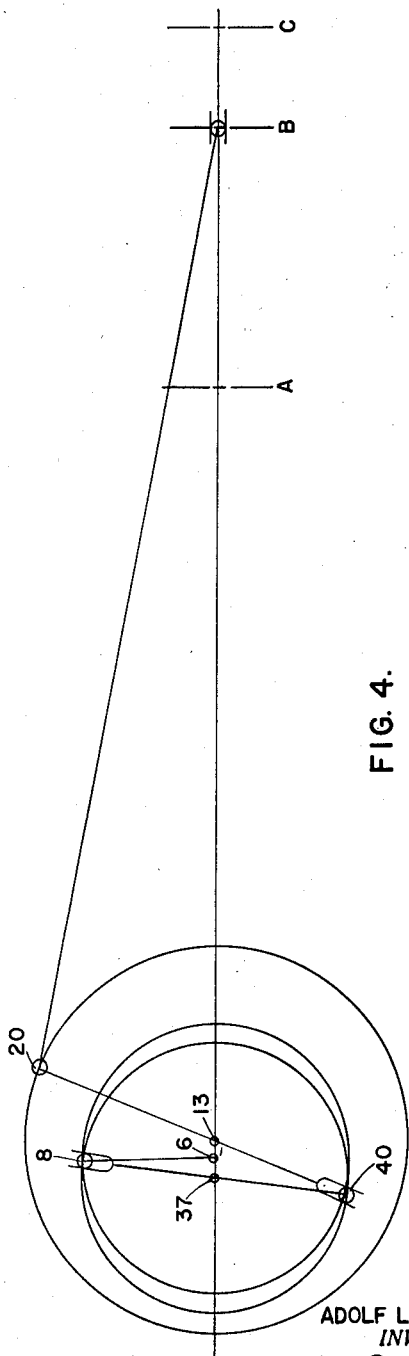
Figure 4 is a side view of Figure 3, showing the paths of travel during one revolution of the flywheel, of different elements of the flywheel assembly and of the crosshead.
Figure 8:
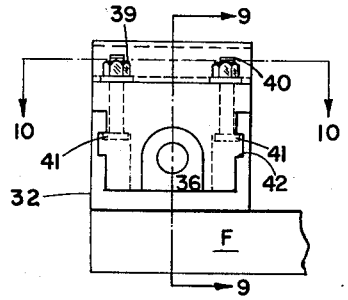
Figure 8 is an end view of the adjusting assembly.
Figure 9:
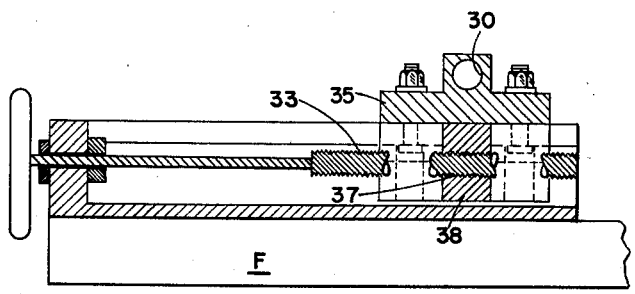
Figure 9 is a sectional view taken along the lines 9—9 of Figure 8.
Figure 10:
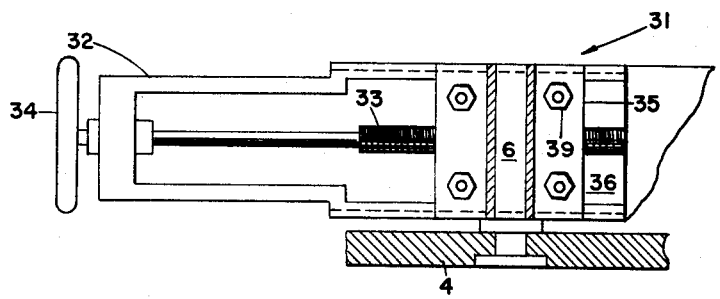
Figure 10 is a sectional view taken along lines 10—10 of Figure 8.

In the embodiment shown in Figures 3 and 4, components common to Figures 1 and 2 are indicated by the same reference numeral.

This embodiment is driven by a variable speed motor 1 in the same manner as the embodiment in Figures 1 and 2, but due to the increase accelerations brought about by the addition of cranks 43 and 44 the arrangement of the components is changed to provide more strength.

In Figure 3, shaft 6 is fitted into bearing support 45 of the frame F'.

Adjusting assembly 31' is now located on the side of crank 11 that is opposite from flywheel 4. The shaft 46 is secured at one end in crank 11 by a pin, or other suitable means. The adjusting assembly housing 32 is secured to the stationary frame F' so that shaft 46 may be adjusted, in the same manner as shaft 6 in Figure 1.

Shaft 46 extends thru assembly 31, and the other end is secured in opening 47 of crank 43, by a pin, or other suitable means.

To crank 43 one end of pin 48 is secured. The other end of pin 48 is journaled in bearing 49, which is slidably fitted into a longitudinal recess 50 of crank 44.

Crank 44 has an opening 51 in the end opposite pin 48. Opening 51 is adapted to receive shaft 13 which is secured in opening 51 by a pin or other suitable means.

The remainder of the elements in Figures 3 and 4 are the same as those of Figures 1 and 2, that have been described.

This embodiment can also be used with the crosshead and table arrangement shown in Figures 5–7, but, like the embodiment of Figures 1 and 2, is not limited to use with this arrangement.

The operation of the embodiment shown in Figures 3 and 4, is the same as the operation of Figures 1 and 2, except that Figures 3 and 4 show two sliding bearings, 9 and 49, instead of one such bearing, 9, in Figures 1 and 2. Sliding bearings 9 and 49 change positions as the flywheel rotates. This has the effect of changing or varying the lengths of two cranks, 11 and 44, thus multiplying the possible variable-acceleration effect of the system of Figures 1 and 2.

Figure 11:
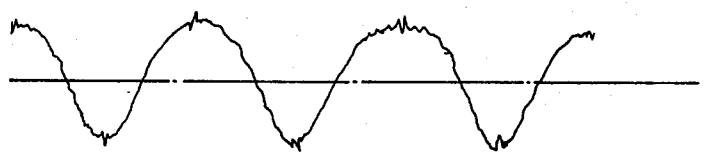
Figure 12:
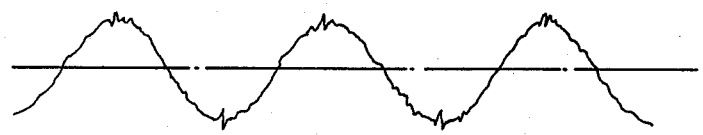
Figure 13:
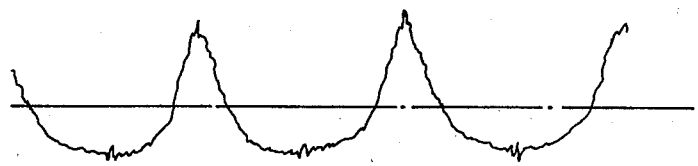
Figure 14:
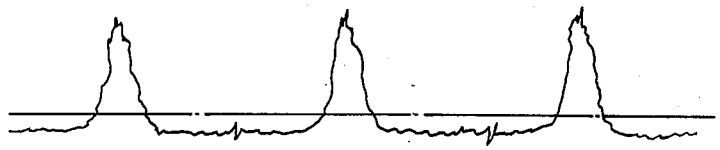

In Figures 11 and 14, different acceleration curves obtainable with the invention are shown. Figures 11 shows the curve obtained with no offset between the relatively movable shafts. Figure 12 shows a sine curve obtained with an offset between the shafts. Figure 13 shows that an increase in offset increases the ratio between the acceleration peaks. Figure 14 shows the curve obtained with the maximum offset between the shafts.

It is to be understood that the form of the invention, herein shown and described, is to be taken as preferred embodiments, and that various changes in the shape, size and arrangement of parts may be resorted to, without departing from the spirit of the invention, or the scope of the subjoined claims.

The following invention is claimed:

1. An accelerator for testing devices under various accelerations comprising: a connecting rod adapted for attachment to a device that is to be tested; a crankpin attached to an end of said connecting rod; a crank assembly comprising a plurality of cranks pivotally connected at one of the crank assembly's ends to said crank pin; a flywheel adjacent the other end of said crank assembly; means connecting the other crank assembly end and said flywheel for driving said assembly from said flywheel and for providing relative sliding and rotary motion between said other end and flywheel, said connecting means comprising a pin and a bearing for said pin, said bearing being slidably mounted relative to said flywheel center; a stationary frame; a bearing located at the center of said flywheel and on its opposite side from said crank assembly comprising a bearing support on said frame and a journal mounted on said flywheel; a variable speed drive means; means drivably connecting said drive means and flywheel; and means for shifting said bearing of said connecting means for varying the length of the flywheel attached crank at said other end of the crank assembly.

2. A device as set forth in claim 1, which further comprises a support for a device to be tested, said support being connected to the other end of said connecting rod.

3. A device as set forth in claim 1 in which said crank assembly comprises a shaft and a stationary bearing therefor, located between the ends of said crank assembly.

4. A device as set forth in claim 1 in which said pin is fixed to said flywheel, said connecting means further comprising a wall of a recess in a crank of said crank assembly, said bearing being drivably associated with said wall.

5. A device as set forth in claim 4 in which said recess comprises a pair of side walls.

6. A device as set forth in claim 4, in which said recess is relatively narrow and extends longitudinally in said last named crank.

7. A device as set forth in claim 1 in which said means for shifting said bearing comprises a reciprocating slide and means reacting against said stationary frame for moving said slide.

8. A device as set forth in claim 7 in which said slide moving means includes a screwthreaded bolt having means thereon for reacting against said frame, and a screw threaded element of the slide which coacts with the screw threaded portion of said bolt.

9. A device as set forth in claim 3 in which one of said cranks is a double arm crank with one of its arms attached to said shaft and in which said crank assembly further comprises a second shaft, attached to the other arm of said double arm crank, and a stationary bearing for journaling said second shaft.

10. A device as set forth in claim 7 in which said means for shifting said part is located on the opposite side of the flywheel from said crank assembly.

11. A device as set forth in claim 7 in which said means for shifting said part is located on the same side of the flywheel as the crank assembly.

12. A device as set forth in claim 9 in which said crank assembly further comprises a second crank fixed to one of said shafts on the flywheel side of said double arm crank, said second crank having a longitudinal recess, a bearing slidable therein, a third crank having at one of its ends a pin that is journaled in said slidable bearing, a transverse shaft attached to the other end of said third crank, a bearing for said transverse shaft, a fourth crank having one end connected to said transverse shaft, and having a longitudinal recess, a bearing slidable therein, and a pin connected to said flywheel and journaled in said bearing and in which said means for shifting said part is drivably connected to said bearing for said transverse shaft.

13. An accelerator for testing devices under various accelerations comprising: a connecting rod adapted for attachment to a device that is to be tested; a crankpin attached to an end of said connecting rod; a crank assembly comprising a plurality of cranks pivotally connected at one of the crank assembly's ends to said crankpin; a flywheel adjacent the other end of said crank assembly; a pin having one end connected to said flywheel; a bearing secured to the other end of said pin, said bearing being slidably connected to the other crank assembly end for driving said assembly from said flywheel and for providing relative sliding and rotary motion between said other end and flywheel; a stationary frame; a bearing located at the center of said flywheel and on its opposite side from said crank assembly comprising a bearing support on said frame and a journal mounted on said flywheel; a motor; means drivably connecting said motor and flywheel; and means for shifting said bearing for varying the length of the flywheel attached crank at said other end of the crank assembly.

References Cited in the file of this patent

UNITED STATES PATENTS

| | | |
|---|---|---|
| 1,006,831 | Dallemagne | Oct. 24, 1911 |
| 2,301,967 | Nosker et al. | Nov. 17, 1942 |
| 2,708,848 | Hohenner | May 24, 1955 |
| 2,741,169 | Weiss | Apr. 10, 1956 |
| 2,782,647 | Wildhaber | Feb. 26, 1957 |